United States Patent
Torr et al.

(10) Patent No.: US 6,668,080 B1
(45) Date of Patent: Dec. 23, 2003

(54) AUTOMATED LAYER EXTRACTION AND PIXEL ASSIGNMENT FROM IMAGE SEQUENCES

(75) Inventors: Philip H. S. Torr, Cambridge (GB); Padmananbhan Anandan, Issaquah, WA (US); Richard S. Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/399,897

(22) Filed: Sep. 21, 1999

(51) Int. Cl.[7] .................................................. G06K 9/34
(52) U.S. Cl. ......................... 382/173; 382/236; 382/107
(58) Field of Search ............................... 382/154, 173, 382/107, 236; 345/427, 419; 348/47, 48, 49, 50; 356/12

(56) References Cited

U.S. PATENT DOCUMENTS 5,557,684 A * 9/1996 Wang et al. ................. 382/107
5,706,417 A * 1/1998 Adelson ...................... 345/640

OTHER PUBLICATIONS

Wang et al. "Representing Moving Images with Layers". IEEE Transactions on Image Processing. V. 3, Issue 6. Sep. 1994, p. 625–638.*
Elias et al. "The Recovery of a Near Optimal Layer Representation for an Entire Image Sequence". International Conference on Image Processing. V. 1. Oct. 1997. p. 735–738.*
Chang et al. "Simultaneous Motion Estimation and Segmentation". IEEE Transactions on Image Processing. V. 6, Issue 9. Sep. 1997. p. 1326–1333.*
Ayer et al. "Layered Representation of Motion Video using Robust Maximum–Likelihood Estimation of Mixture Models and MDL Encoding". Fifth International Conference on Computer Vision. Jun. 1995. p. 777–784.*
Borshukov et al. "Motion Segmentation by Multistage Affine Classification". IEEE Transactions on Image Processing. V. 6, Issu 11. Nov. 1997. p. 1591–1594.*
R. Szeliski, A multi–view approach to motion and stereo. In IEEE Computer Society Conference on Computer Vision and Pattern Recognition (CVPR'99), Fort Collins, Jun. 1999.
J.Y.A. Wang and E.H. Adelson, Layer representation for motion analysis. In IEEE Computer Society Conference on Computer Vision and Pattern Recognition (CVPR '93), pp. 361–366, New York NY, Jun. 1993.
S. Baker, R. Szeliski, P. Anandan, A layered approach to stereo reconstruction. In IEEE Computer Society Conference on Computer Vision and Pattern Recognition (CVPR'98), pp. 434–441, Santa Barbara, Jun. 1998.
J. Bergen, P. Anandan, et al., Hierarchical Model–Based Motion Estimation, Proc. 2nd European Conference on Computer Vision, pp 237–252, 1992.
Martin A. Fischler and Robert C. Bolles, Random Sample Consensus: A Paradigm for Model Fitting with Applications to Image Analysis & Automated Cartography, Communications of the ACM, vol. 24, No. 6, Jun. 1981.

* cited by examiner

Primary Examiner—Amelia M. Au
Assistant Examiner—Colin LaRose
(74) Attorney, Agent, or Firm—Lyon & Harr, LLP; Mark A. Watson

(57) ABSTRACT

Automated layer extraction from 2D images making up a 3D scene, and automated image pixel assignment to layers, to provide for scene modeling, is disclosed. In one embodiment, a computer-implemented method determines a number of planes, or layers, and assigns pixels to the planes. The method can determine the number of planes by first determining the high-entropy pixels of the images, and then determining a 1-plane through a predetermined n-plane estimation, such as via a robust estimation, and a most likely x-plane estimation, where x is between 1 and n, such as via a Bayesian approach. Furthermore, the method can assign pixels via an iterative EM approach based on classifying criteria.

26 Claims, 7 Drawing Sheets

AUTOMATED LAYER EXTRACTION AND PIXEL ASSIGNMENT FROM IMAGE SEQUENCES

FIELD OF THE INVENTION

This invention relates generally to three-dimensional (3D) scene modeling in which the scene is made up from a number of images, and more particularly to automated layer extraction from the images making up such a scene, and automated pixel assignment of the pixels of the images to a particular layer of the layers that have been extracted.

BACKGROUND OF THE INVENTION

One type of graphics application for computers and other such devices is three-dimensional (3D) scene modeling. Generally, in 3D scene modeling, a 3D scene is modeled from a sequence of two-dimensional (2D) images taken of the scene by cameras placed at various locations around and/or within the scene. This sequence of 2D images allows for the creation of a 3D geometric model of the scene, including in some instances what is known as a texture map that captures the visual appearance of the scene. The texture map is a 2D bitmapped image of the texture of a surface of the 3D scene, such as a uniform texture (e.g., a brick wall), or an irregular texture (e.g., such as wood grain or marble). The texture map is then "wrapped around" geometric objects within the 3D scene.

In another approach, the sequence of 2D images provides for the creation of the 3D scene by decomposing the scene into a collection of 3D layers, or sprites. Each 3D layer includes a plane equation, a color image that captures the appearance of the sprite, a per-pixel opacity map, and a per-pixel depth-offset relative to the nominal plane of the layer. A generative model for this approach—that is, constructing the 3D layers of the 3D scene from the sequence of 2D images—is described in the reference S. Baker, R. Szeliski, and P. Anadan, A layered approach to stereo reconstruction, in IEEE Computer Society Conference on Computer Vision and Pattern Recognition (CVPR '98), pages 434–441, Santa Barbara, June 1998.

However, the approach of decomposing a 3D scene into 3D layers has disadvantages as the approach is known in the prior art, including as described in the reference of the previous paragraph. First, recovery of the 3D layers from the sequence of 2D images for constructing a model of a 3D scene is accomplished by manual input. Among other things, this means that a user must painstakingly divide a scene into 3D layers, based on at least large part on subjective criteria that may be different to each user. Thus, the decomposition approach is not well suited to automatic rendering of 3D scenes as is the case with texture mapping approaches, and therefore may not be selected as the utilized approach, even if it were to yield better results than other approaches.

Second, assigning pixels of the 2D images to the extracted 3D layers is known to be required, but a complete methodology as to how to assign pixels to layers as a general matter is not known. This means that pixels of images are assigned to layers on an ad hoc basis, as opposed to following a formal methodology, or, better yet, having an automated manner of pixel assignment to layers. This disadvantage of the decomposition approach also militates against the use of the approach to automatic rendering of 3D scenes, such that other approaches, such as texture mapping approaches, may instead be chosen for rendering, even if these alternative approaches yield less optimal results.

For these and other reasons, then, there is a need for the present invention.

SUMMARY OF THE INVENTION

The invention relates to automated layer extraction from a number of 2D images that are formed by different cameras viewing a 3D scene from different viewpoints, and the automated assignment of pixels of the images to the extracted layers. As used herein, layers are also referred to as sprites. In one embodiment, a computer-implemented method is operable on a number of 2D images of such a 3D scene, where each 2D image has a number of pixels that correspond to the pixels of the other images. The method determines a number of planes of the scene, and assigns pixels of the images to one of the planes. At least the planes of the scene are then output.

In one embodiment, the method determines the number of layers via a statistical estimation approach that embodies notions of physical coherence of surfaces and objects. These include: (i) that the pixels belonging to the same layer should approximately form a planar region in 3D space (i.e., their combined offsets relative to a plane should be small; (ii) that nearby pixels in an image are likely to belong to the same layer; and, (iii) the image appearance of the different portions of a layer should be similar. The method of this particular embodiment uses Bayesian reasoning techniques, as known within the art, and in so doing embodies the notions of physical coherence in terms of Bayesian "prior probabilities" regarding the physical description of the scene, and the evidence provided by the images as "likelihoods" associated with the specific layered decomposition of the scene. The "posterior probabilities" associated with different possible layer decompositions (i.e., the number of layers where the number is between one and some predefined maximum possible value n, and the associated pixel assignments) are evaluated and the most likely decomposition as determined by an estimation algorithm is chosen.

The number of planes can be first determined by using the high-entropy pixels of the images. These are pixels which have distinct image appearance such as corners of regions or highly textured points (as opposed to, for example, areas which are homogeneous in color). Also in one particular embodiment, the method assigns all pixels of the images, other than the high-entropy pixels, to the planes via an iterative Expectation Maximization-type approach based on Bayesian decision criteria.

Embodiments of the invention provide for advantages not offered by the prior art. Foremost, embodiments of the invention provide for an automated manner by which 3D layers are extracted from the 2D images making up the scene, and for an automated manner by which pixels of the images are assigned to these extracted layers. This allows for the layer decomposition approach to 3D scene modeling to be automated, such that it becomes a more attractive approach to such modeling as compared to other approaches that are already automated, such as texture mapping approaches.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
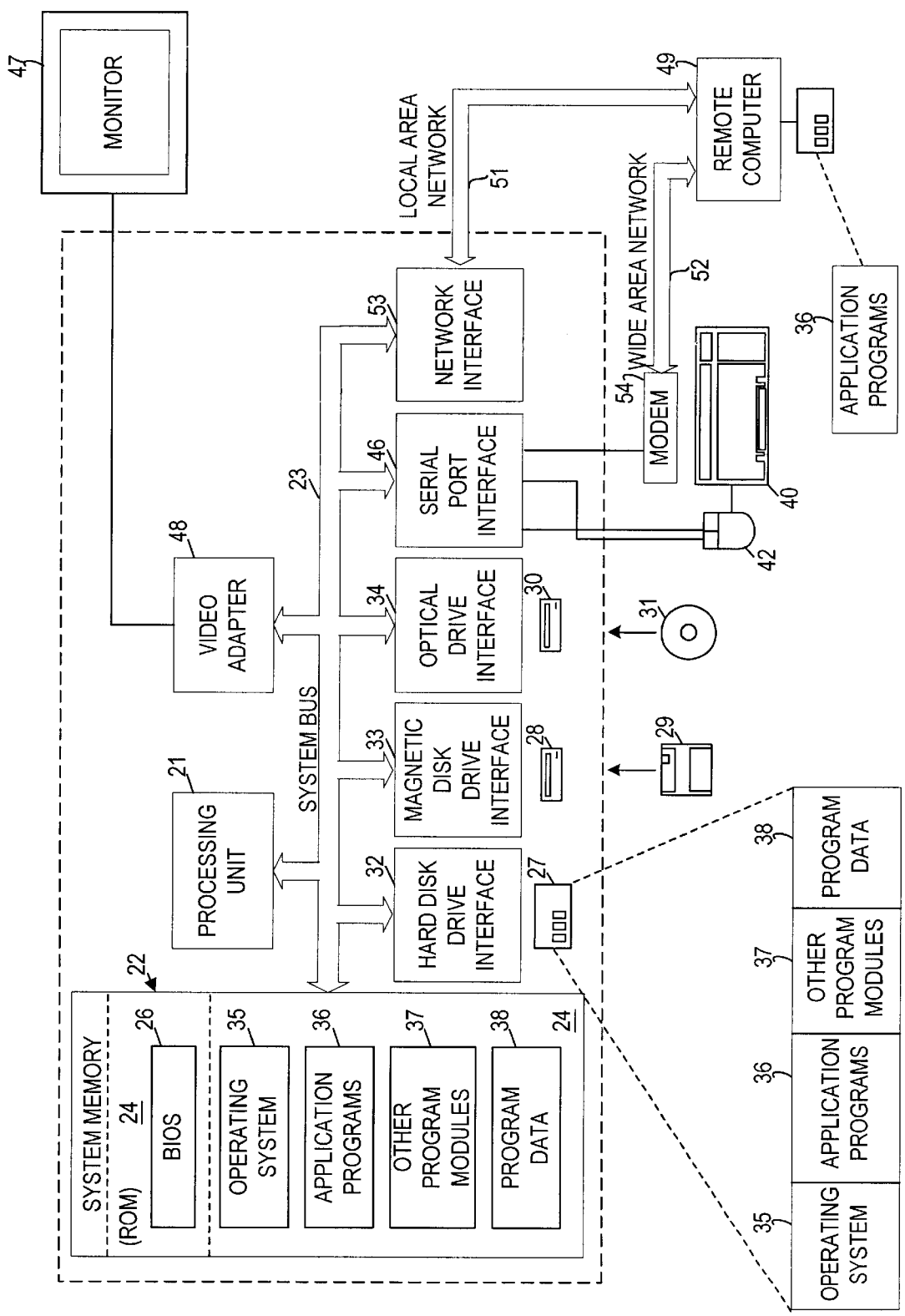
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

3D Scene, 2D Images, and Pixels

Figure 2:
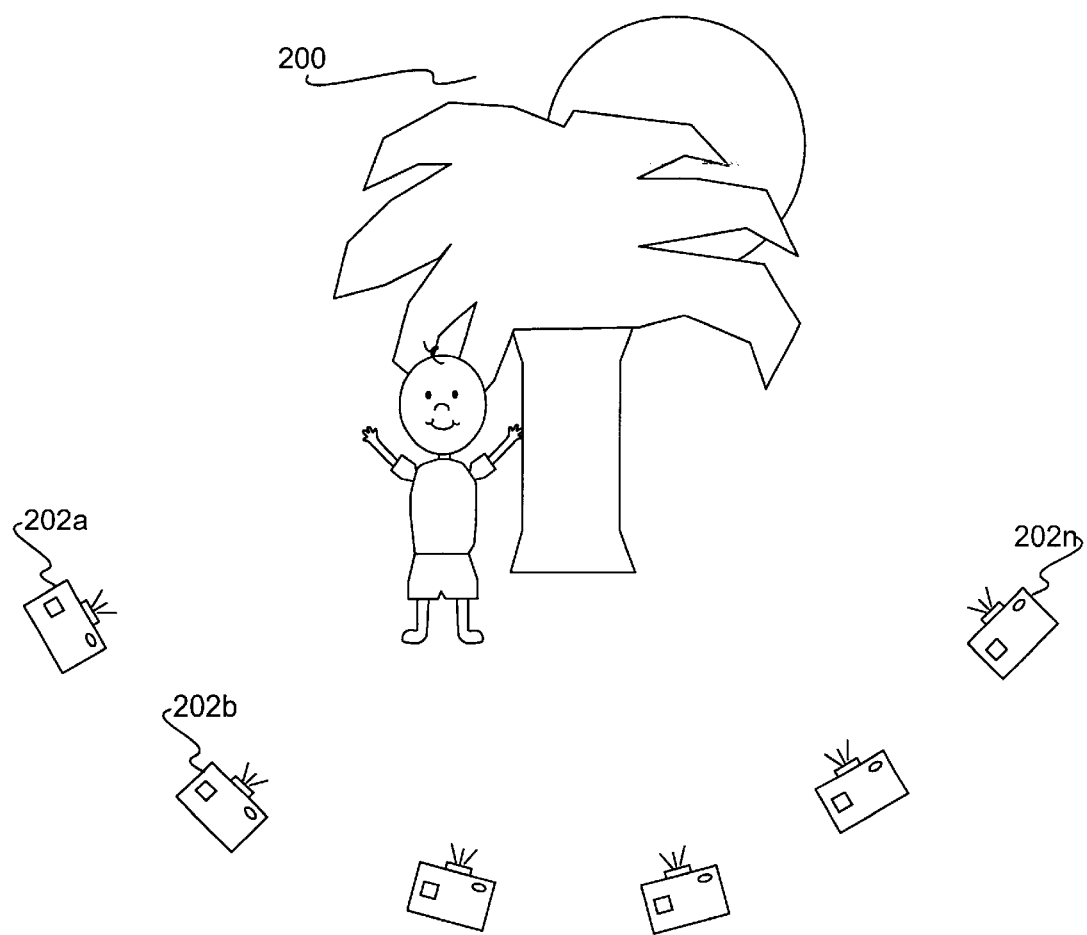
FIG. 2 is a diagram of a three-dimensional scene and a number of cameras to provide a corresponding number of images of the scene.

In this section of the detailed description, an overview is provided of a 3D scene and its derivation from a number or sequence of 2D images made up of a number of pixels, for modeling purposes. Referring first to FIG. 2, a diagram of a three-dimensional scene and a number of cameras to provide a corresponding number of images is shown. The 3D scene 200 for purposes of illustration and example only includes three objects, a person, a tree, and a sun. The person is in front of the tree, which is itself in front of the sun. A number of cameras 202a, 202b, . . . , 202n is aligned around and within the scene 200. The matrices of the cameras are defined as their location in accordance with a particular coordinate system. Each camera is able to produce a 2D image of the scene, slightly offset from the other 2D images produced by the other cameras, as a result of each camera being in a different location relative to the scene. The images are used to generate a 3D model of the scene. The sequence of images produced by the cameras 202a, 202b, . . . , 202n is referred to as the raw data D.

Figure 3:
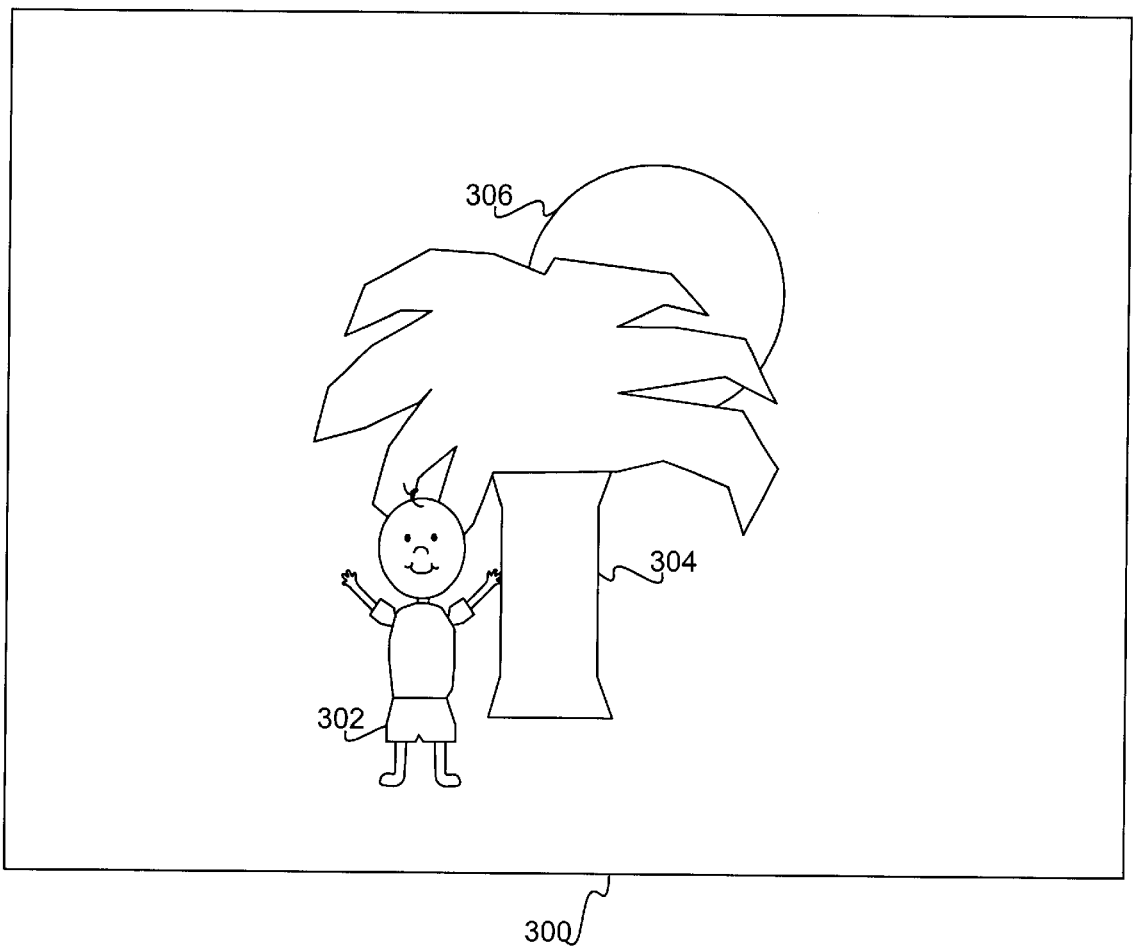
FIG. 3 is a diagram of an illustrative image of the scene produced by one camera of FIG. 2.

Referring next to FIG. 3, a diagram of an illustrative image produced by one camera of the scene of FIG. 2 is shown. The image 300 includes the objects of the scene, the person 302, the tree 304, and the sun 306. The image produced by the other cameras is similar to that of the image 300, except that the objects of the scene are offset and vary in position as compared to the image 300, due to the different locations of the cameras producing such images. However, because the cameras are themselves relatively close to one another, the objects within the scene in the images produced by the cameras do not vary significantly between images.

Figure 4:
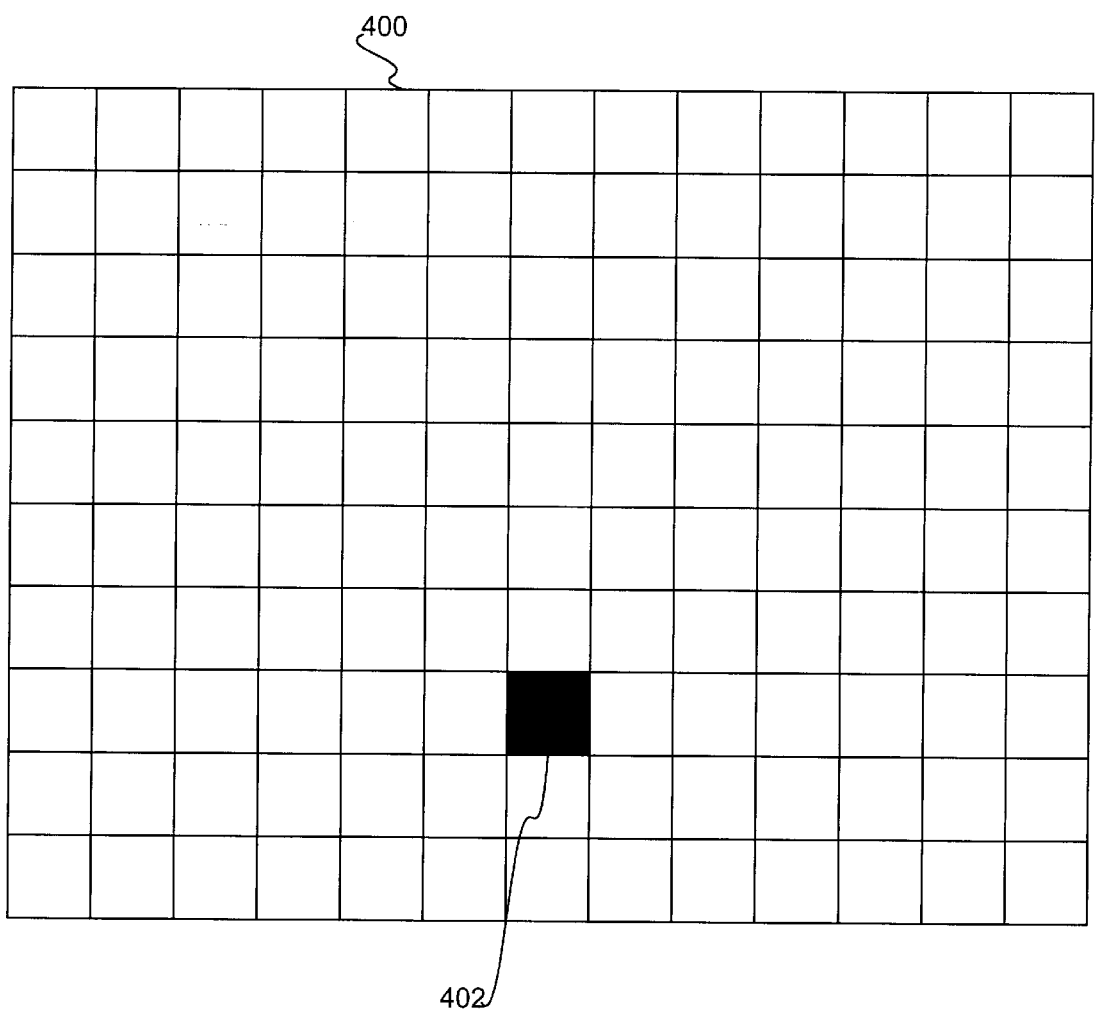
FIG. 4 is a representative diagram of the constituent pixels of an image, such as the image of FIG. 3.

Each image is made up of a number of picture elements, or pixels. As shown in FIG. 4, the pixels of an image, such as the image 400, are arranged in a grid formation, with a predetermined number of row and a predetermined number of columns, such that any pixel, such as the pixel 402, can be identified by a given row and a given column, referred to by (x, y), where x is the row number and y is the column number. It is noted that the pixels of each image correspond to the pixels of every other image. That is, each image desirably has an identical number of pixels configured in an identical number of columns and rows. Thus, it is said that the number of pixels of a given image correspond to the number of pixels of another given image.

Ultimately, the modeling of the scene from the sequence of images of the cameras results in the identification of layers, or planes, from the images that correspond to different depths within the 3D scene. For example, in the case of the scene of FIG. 2, there is likely to be three layers identified, one each for the human, the tree, and the sun, since each of these three objects is at a different depth compared to the other objects. The plane or layer including the sun is a special plane in that it is the horizon or infinite plane, and is said to be infinitely away from the vantage point of any camera, such that the objects within this plane appear unmoved from image to image, because of their far distance from each camera. The modeling of the scene includes the identification of the planes, and also the segmentation of each pixel of each image into one of the planes that have been identified.

Preprocessing of the Images

Preprocessing of the images is described in this section of the detailed description. Preprocessing of the data D prior to its use by embodiments of the invention can include the following, although the invention is not so limited. A coarse-to-fine algorithm as known in the art can be used to obtain initial disparity estimates for each pixel of the images, where disparity is the distance a pixel in the first image has moved in the other images as a result of the other images being generated by cameras in different locations than the camera producing the first image. In one embodiment, the images are rectified to the first image by transforming (or equivalently, "warping") each image such that all points at infinity are completely aligned (i.e., show zero disparity) after the transformation. As can be appreciated by one of ordinary skill within the art, such a rectification process involves determining the $H_\infty^{1j}$, which is the homography of the plane at infinity between the first image and the jth image.

This process also has the effect of to remove all the effects of camera rotation (i.e., the rotation of the their optical axis relative to each other). Although the plane at infinity is used here, in general, any plane in the scene can be chosen; the plane at infinity offers a choice that is neutral to the scene, and this is why it is particularly used in one embodiment. In effect, the rectification process creates new images that would have been created by a set of virtual cameras whose locations correspond to those of the original cameras, but whose optical axis are all aligned to that of the camera of the first image.

Registering each image to the plane at infinity has the effect that the disparity, or motion, of every pixel is constrained to lie along pixels in corresponding scan-lines in the other images, and only the magnitude of the disparity varies from pixel to pixel. The disparity $\delta_j(x, y)$ at pixel $(x, y)$ in the first image is herein taken to mean the motion along the epipolar line (which now is the scan-line) between the first image and the jth image. Because the images are rectified to the plane at infinity, it is a bijective function of the depth of that pixel, $\delta_j(x, y)=\rho_j(Z(x,y))$. The transformation $\rho$ is a function only of the calibration and camera matrices. It is used later when error distributions in the image are transformed to error distributions in three dimensions, as will be described. The notation Z is adopted for the set of depths (where depth refers to the distance of the scene point from the optical center of the first camera measured along the optical axis), and $Z(x, y)$ for the depth of a pixel $(x, y)$ in the first image.

Formal Model and Plane Parameterization

A formal parameter formulation used for 3D modeling of the scene via the sequence of 2D images is now presented in this section of the detailed description. The set of input images is denoted by D, the data, as has been described. The model M includes a set of m planes $\Theta$ with parameters $\theta_j$, =1 ... m, and a set L of per-pixel labels $l(x, y)$ for the first image. It is noted that initially nothing is known about the number of layers m.

However, in one embodiment, some reasonable assumption about the likelihood of the number of layers is known, and is incorporated into the algorithm. The first image is used to initialize the subsequent segmentation of pixels of the images into different planes, and herein the segmentation and labeling is performed in the coordinate system of the first image. This is done because inter-image motions, or disparities, are small, as has been noted, so that it is more intuitive to perform the segmentation relative to the image rather than relative to a 3D-based coordinate system. Thus, 3D modeling of the a scene means extracting M from D, where some prior information I exists, including the camera position for each image, the camera calibration (e.g., color and other settings regarding the cameras), and any assumptions about underlying noise distributions of the images taken by the cameras.

The parameters of each plane are $\theta=(a,b,c)$ such that $aX+bY+cZ=1$, where X, Y, Z are Euclidean coordinates. This parameterization is selected because it excludes all planes passing through the origin of the coordinate system, defined as the optical center of the first camera, where such planes are of the form $aX+bY+cZ=0$. Such planes project to a line in the first images, as well as subsequent images if the base line is small, and thus correspondence cannot be recovered from them. It is noted that $\theta=(a, b, c)$ lies along the normal of the plane.

As has been mentioned, the coordinate system is selected such that the origin is at the first camera's optical center. Thus, in the first image, $x=X/Z$ and $y=Y/Z$, which leads to $ax+by+c=1/Z$. Given the plane and the $(x, y)$ coordinate of any pixel, then, its depth can be found, and hence its corresponding pixel in any other image. For the case when the direction of motion along the optical axis (the optical axis is a line extending along the line of sight of the first camera and through its optic center) is small relative to the distance to the 3D point, $1/Z$ is roughly proportional to the disparity between images. a and b give the disparity gradients in the x, y directions and c gives the inverse depth of the plane at the principal point.

As has been noted, one plane is privileged, which is the plane at infinity. This plane is always represented by a layer and has the fixed parameters $\theta_\infty=(a,b,c)=(0,0,0)$. Although this ideal cannot truly exist in a Euclidean representation, it nevertheless serves a useful purpose. All pixels that are so distant that their disparity is swamped by noise (e.g., the sky, or the sun of the scene in FIG. 2) have poorly conditioned depths, and cannot be easily segmented into different planes. These pixels are thus all grouped together into the plane at infinity.

Methods

In this and subsequent sections of the detailed description, methods according to varying embodiments of the invention are described. The computer-implemented methods are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description.

Figure 5:
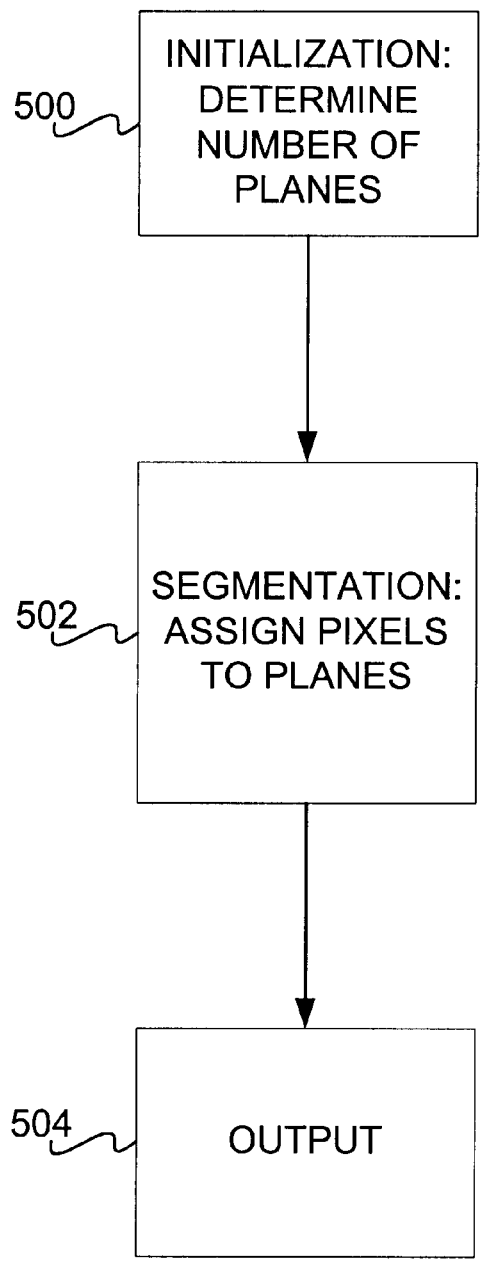
FIG. 5 is a flowchart of a general method according to an embodiment of the invention.

The general approach in accordance with an embodiment of the invention is first described. The approach is operable on a 3D scene having a plurality of images, where each image has a plurality of pixels corresponding to the plurality of pixels of every other image, as has been described in the previous section of the detailed description. In one embodiment, the 3D scene, the images and their pixels may be input as an initial part of a method of an embodiment of the invention, although the invention itself is not so limited. The approach provides for modeling of the 3D scene from the plurality of images. Referring to FIG. 5, a flowchart of such a method, according to an embodiment of the invention, is shown. In 500, an initialization stage is performed. In the initialization stage, a number of planes, or layers, of the scene is determined from the images. For example, as has been described in conjunction with FIGS. 2 and 3, each layer or plane can correspond to an object or objects within the scene at a given depth. One embodiment by which the initialization stage can be specifically accomplished is described in a succeeding section of the detailed description.

In 502, a segmentation stage is performed. In the segmentation stage, pixels of the images are assigned to one of the planes determined in 500. That is, each pixel of the images is assigned to one of the planes determined in 500. It can be said that "any remaining pixels" of the images are assigned into one of the planes in that one or more pixels of the images may have been assigned to planes in 500, as part of the initialization stage. Assigning pixels of the images to planes completes the modeling of the 3D scene, in that the separate planes that when superimposed make up the 3D scene, and the pixels that are part of each plane, are completely defined. One embodiment by which the segmentation stage can be specifically accomplished is described in a succeeding section of the detailed description.

Finally, in 504, output is accomplished. At least the planes of the scene are output. That is, at least the number of the planes, and/or the identification of the planes, are output. Other aspects of the model can also be output. For example, the assignment of the pixels of the images to their respective planes can be output. Put another way, the definition of the planes by their constituent pixels can also be output. The complete model may be output as well in one embodiment. The invention is not limited to the manner by which output is accomplished. For example, in one embodiment, output can be to a further analysis program or software component, that allows for analysis and conclusions to be drawn on or from the model. As another example, output can be displayed on a displayed device, or printed to a printer, etc. As a third example, output can be stored on a storage device, for later further analysis by a program or software component.

Figure 6:
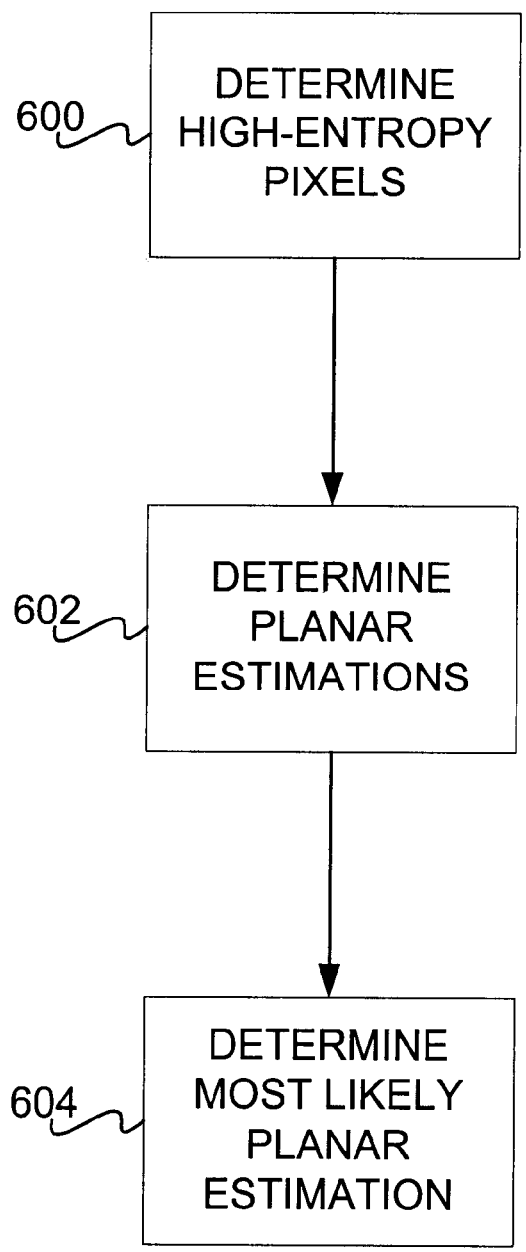
FIG. 6 is a flowchart of a method to perform the initialization stage of FIG. 5, according to an embodiment of the invention; and, FIG. 7 is a flowchart of a method according to an embodiment of the invention.

First Stage: Initial Computation of the Number of Layers and the Layer Plane Parameters In this section of the detailed description, the initialization stage of the general approach described in the preceding section is presented in more detail. The presentation is made in conjunction with FIG. 6, which is a flowchart of a method for the initialization stage of the general approach according to one embodiment of the invention. Referring now to FIG. 6, in 600, the high-entropy pixels of the images are determined. The probability distribution of the disparity for the each pixel is first determined. High-entropy pixels are defined herein generally as pixels for which the entropy of this distribution exceeds a certain threshold. Entropy is generally defined as, $$\sum_p \log p,$$

where p refers to a pixel. To detect these, in one embodiment, a feature extractor is run on the first image, and features with high entropy are used as input to the extractor. Feature extractors are usually based upon looking for distinctively shaped points, or features, that have characteristic spatial dispositions that are easy to match. In one embodiment, pixels are looked for that have a unique match as evidence by the fact that their probability distribution of motions is very peaked. The invention is not so limited, however.

Next, in 602, the number of plane layers is determined. This is done by estimating the posterior likelihood for 1 to n-planes. An x-plane estimation is the planar parameters of the scene where there are x planes. Such planar parameters include those as have been described, including the orientation of the planes. Thus, for each model $M_i$, with i layers, or planes, and i=1 . . . n, the 3i parameters of the plane $\Theta_i$ are robustly estamated from the high-entropy points.

In one embodiment, a RANSAC-based algorithm, is utilized. This algorithm is referred to herein as PILLAGE. It is noted that the algorithm is applicable to other problem domains than the situation described in this section of the detailed description. Accordingly, a further section of the detailed description describes the PILLAGE algorithm in a more detailed and general manner, such that those of ordinary skill within the art will be able to appreciate its applicability to domains other than that being specifically considered here. Rather than maximizing the number of inliers, as is done with a RANSAC algorithm, in the PILLAGE algorithm a posterior itself is estimated and maximized for each sample, $$\max_{m\Theta L} Pr(m\Theta L \mid DI) = \frac{Pr(D \mid m\Theta LI) Pr(m\Theta L \mid I)}{Pr(D \mid I)}$$

where D is the raw image data as has been described, and m, $\Theta$, L are the model parameters, as have also been described. In one embodiment, the PILLAGE algorithm is as follows. First, three spatially close points are simultaneously sampled for each plane. Next, the parameters of each plane $\theta_i$, i=1 . . . k are estimated, and the label probabilities are estimated. The posterior given above is then determined for this set of plane parameters. The sampling is repeated a fixed number of times, and the best result is stored. Generalized EM is used to improve the result in one embodiment. By this or another algorithm, the initializations of the plane parameters for each $M_i$ are obtained.

Finally, in 604, the most likely of the 1 through n plane estimations of the scene is determined as the number of planes to utilize for the scene. In one embodiment, a Bayesian approach, is used to make this determination. The evidence used in the Bayesian method to make the determination can be approximated by assuming that each of the estimated plane parameters is approximately normally distributed around its mode, discounting spatial extent of the plane. As can be appreciated by those of ordinary skill within the art, Laplace's approximation can be used for making these approximations.

Thus, the result of the method of FIG. 6 is the completion of the initialization stage of the general approach described in the previous section of the detailed description. This results in the determination of the number of planes for the scene to be used for modeling of the scene. It is noted that at least some of the high-entropy pixels determined in the method of FIG. 6 are implicitly assigned to one of the planes, since the planes themselves were selected by first determining the high-entropy pixels, and then corresponding the former to the latter. Thus, in the segmentation stage of the general approach, as is described in more detail in the next section of the detailed description, such pixels do not have to be assigned to one of the planes, since they are already implicitly assigned.

Second Stage: Segmentation

In this section of the detailed description, the segmentation stage of the general approach described in a preceding section is presented in more detail. The segmentation stage involves assigning any remaining pixels of the images into one of the planes determined by the initialization stage. The description presented in this section first provides a probabilistic formulation used in the segmentation approach of one embodiment of the invention, and then provides description of an ExpectationMaximization (EM) approach used to effect segmentation in one embodiment of the invention.

A probabilistic formulation used in the segmentation approach is now first described. As mentioned, the model parameters m, $\Theta$, L are chosen so as to maximize the posterior probability, $$\max_{m\Theta L} Pr(m\Theta L \mid DI) = \frac{Pr(D \mid m\Theta LI) Pr(m\Theta L \mid I)}{Pr(D \mid I)}$$

where D is the raw image data as has been described. For the purposes of parameter estimation, the denominator is discounted, since it is constant for all values of the parameters. A Bayesian method of marginalization is then used to remove the depth parameter from the posterior probability of the plane, $$Pr(m\Theta L|DI) = \int_z Pr(m\Theta LZ|DI)dZ.$$

This is useful when attempting to determine what label a pixel should have, or when re-estimating the planes using a Generalized EM approach. Marginalizations allows for the use of a plane to capture the motion of a region of an image, by averaging out the relief, or parallax, out of that plane.

Next, the posterior likelihood is decomposed into its component parts. Because the number of layers m has already been determined, and assuming that the noise across the image is not spatially correlated, this can be evaluated as the product of the Maximum A-Posterior (MAP) likelihoods at each individual pixel:

$$\int_z Pr(m\Theta LZ|DI)dZ$$

$$\int_Z \prod_{xy} Pr(D|\Theta z(x,y)l(x,y)I)Pr(\Theta LZ|I)dZ$$

By considering each pixel individually, dropping the (x, y) index, adopting the notation $l_j(x, y)$ for $l(x, y)=j$, and letting $\tilde{L}$ be the set of labels excluding the label for pixel (x, y), then $$Pr(D|\Theta zlI)Pr(\Theta LZ|I) =$$

$$\sum_{j=1}^{j=m} Pr(D|zI)Pr(l_j|I)Pr(z|\theta_j I)Pr(\theta_j|I)Pr(l_j|\tilde{L}I),$$

which is a mixture model between the layers, with spatial correlation between the label parameters.

The form of the likelihoods is now described. The term $Pr(D|z\theta_j I)$ is the likelihood of the pixel having a particular depth, or disparity, hypothesis z. That is, it is the likelihood that a pixel should be assigned to the plane of the particular depth. It can be evaluated from the cross correlation between the pixel in question and its correspondences in each other image of the sequence. Therefore, it only depends directly on the depth and can be written $(D|\theta_j zI)=(D|zI)$. Now, consider that the variation in intensity between images can be modeled as Gaussian with mean $\mu_i$ and standard deviation $\sigma_i$. Denote $\Delta i_j(x,y)$ as the difference in color intensity between the pixel in image one and its corresponding pixel in image j. Then, $$Pr(D|zI) = \prod_{j \neq 1} ((1-p_o)\Phi(\Delta i_j(x,y)|\mu_i\sigma_i) + \alpha p_o),$$

where $\Phi(\Delta i_j(x,y)|\mu_i\sigma_i)$ is the Gaussian likelihood $$\Phi(\Delta i_j(x,y)|\mu_i\sigma_i) = \left(\frac{1}{\sqrt{2\pi}\,\sigma_i}\right)\exp-\frac{\Delta i_j(x,y)}{2\sigma_i^2},$$

$p_o$ is the probability of occlusion, or that the pixel is in some other way radically different—for instance, due to the interpolation error when working out the cross correlation—and $\alpha$ is a constant being the probability of the intensity difference given an occlusion, which is uniform over the range of intensity.

As described, the depth is integrated out. For this to occur, the likelihood is discretized and multiplied by the prior. To discretize the likelihood given for each pixel, the likelihood equation of the preceding paragraph is estimated over a set of disparity hypotheses. Usually, the scenes under consideration are from video sequences. In such sequences, the inter-frame motion is zero to four pixels, thus twenty disparity hypotheses increasing in steps of 0.2 can be used to sample the zero-to-four pixel disparity range.

The form of the priors is now described. Using the product rule for combining probabilities, known in the art, the prior can be decomposed as follows, $$Pr(Z\Theta L|I) = Pr(Z|\Theta LI)Pr(\Theta L|I).$$

A prior correlation between the orientation parameters and shape or outline of the projection of a plane does not need to be assumed. Therefore, $Pr(\Theta L|I) = Pr(L|I)Pr(\Theta|I)$. The prior $Pr(\theta|I)$ on a given plane's parameters is assumed to be Gaussian on the parameters a, b, c with zero mean and standard deviations $\sigma_a$, $\sigma_b$, and $\sigma_c$.

The prior $Pr(Z|\Theta LI)$ controls the amount of parallax desired. In real situations, points do not always lie exactly on a plane. However, many surfaces can be modeled as a plane together with some relief leading to the plane plus parallax algorithms. To make this heuristic concrete, the distribution of $Pr(Z|\Theta LI)$ is defined in terms of a distribution of the parallax from the plane. This allows the plane to be recovered without knowing the disparities. The distribution $Pr(Z|\Theta LI)$ is specified in terms of the amount of parallax, as a mean zero Gaussian with $\sigma_p=0.5$. This may then be convolved with the discretized likelihood as has been specified. To recover the likelihood that any given pixel belongs to a given layer, or plane, j, given the plane parameters $\theta_j$, the integrated likelihood can be used $$Pr(D|l_j I) = \int_z Pr(D|zI)Pr(l_j|I)Pr(z|\theta_j I)Pr(\theta_j|I)Pr(l_j|\tilde{L}I)dz.$$

A uniform prior distribution then is taken on z.

The prior $Pr(L|I)$ represents a belief about the likelihood of the spatial disposition of the world. In the general case, it is not known how this should be evaluated. However, what can be evaluated is the probability that pixel (x, y) has a label k given L. Therefore, denoting $l_k(x, y)$ as an indicator variable, such that $l_k(x, y)=p1$ if pixel(x, y) is in the k layer, or plane, or 0 otherwise, then $$Pr(l_k(x,y)|\tilde{L}I) = \frac{Pr(\tilde{L}|l_k(x,y)I)Pr(l_k(x,y)|I)}{Pr(\tilde{L}|I)},$$

where the normalizing constant is $$Pr(\tilde{L}|I) = \sum_{j=1}^{j=m} Pr(\tilde{L}|l_j(x,y)I)Pr(l_j(x,y)|I).$$

The prior $Pr(l_k(x, y)|I)$ is the probability that a given pixel lies in a given layer. In the absence of other information, it is reasonable that this should be uniform, except, however, for the layer of the plane at infinity $l_\infty$, which is deemed more likely a priori. Given points with low disparity, and hence high variance in Z, it is reasonable to assign them to the plane at infinity rather than some arbitrary plane. Using a factorized approximation, $$Pr(\tilde{L} \mid l_k(x, y)I) \approx \prod_{uv} Pr(l(u, v) \mid l_k(x, y)I).$$

Because l(u, v) is not known, but rather only its distribution is known, the above quantity is replaced by its expectation when using an EM approach:

$$Pr(\tilde{L} \mid l_k(x, y)I) \approx \prod_{uv} \sum_{j=1}^{j=m} Pr(l_j(u, v) \mid l_k(x, y)I)Pr(l_j(u, v) \mid I).$$

An issue is the manner by which $P_{jk=Pr(l_j}(u,v)|l_k(x,y)I)$ is evaluated. The information that is known that may affect this distribution, a priori, is the distances between the points $\Delta d$, and the difference in their color values $\Delta c$. It is desirable to have the following properties for this distribution. If $l(u, v)=k$, then $p_k$ is desirable to be high. If the two pixels are close and/or of similar color, they are more likely to have the same label, falling off to a probability $1/m$, where m is the number of layers, if the pixels are far apart or dissimilar in color. It is desirable for the converse to be true as well: if $l(u, v) \neq k$, it is desirable to have $p_k$ to be low if the pixels have the same color or are near, rising to $m-1/m$ if they are distant.

In one embodiment, the distribution is such that the probability that the two pixels belong to the same layer $p_{jk}$, j=k is modeled as a contaminated Gaussian, $Y(\Delta c|\mu_c, \sigma_c, \alpha_c, p_c)$, where $p_c=1/m$. The mixing parameter $\alpha_c$ controls the amount of homogeneity expected in the layer, the mean $\mu_c=0$, and the standard deviation is set to be a function of the distance $\sigma_c=\beta_c/\Delta x$. However, the invention is not limited to this embodiment.

A generalized EM approach to assigning pixels to one of the planes, based on and inclusive of the probabilistic formula described above, is now described. The approach utilizes at least one classifying criteria for pixel assignment, such as (but not limited to) proximity modulated by color, and depth distribution. In the EM approach, the labels are treated as missing data. The EM approach in one embodiment of the invention proceeds as follows. First, the number of layers m is estimated, as well as the parameters of their associated planes, using the approach described in the initialization stage of the previous section of the detailed description. Next, missing data values L are replaced by their expectations, given the parameters $\Theta$. Third, the parameters $\Theta$ are estimated, assuming the missing data are given by their expected values. Next, the missing values are re-estimated, assuming the new parameters are correct. This continues until convergence has been achieved.

In the E-part of the EM approach, for a given label $l_k(x, y)$, the prior is as follows, $$Pr(\hat{l}_k \mid D\theta_k \tilde{L}I) = \frac{Pr(D \mid l_k I)Pr(\tilde{L} \mid l_k I)Pr(l_k \mid I)}{\sum_{j=1}^{j=k} Pr(D \mid l_j I)Pr(\tilde{L} \mid l_j I)Pr(l_j \mid I)}$$

where the quantities on the right-hand side are those estimated at the previous iteration, and $\hat{l}_k$ is to be estimated, using the equations provided earlier in this section of the detailed description, $$Pr(D|l_j I) = \int_z Pr(D|zI)Pr(l_j|I)Pr(z|\theta_j I)Pr(\theta_j|I)Pr(l_j|\tilde{L}I)dz, \text{ and}$$

$$Pr(\tilde{L} \mid I) = \sum_{j=1}^{j=m} Pr(\tilde{L} \mid l_j(x, y)I)Pr(l_j(x, y) \mid I).$$

In the M-part of the EM approach, maximization involves finding the set of plane parameters $\Theta$ that maximize, as given earlier in this section of the detailed description, $$\max_{m\Theta L} Pr(m\Theta L \mid DI) = \frac{Pr(D \mid m\Theta LI)Pr(m\Theta L \mid I)}{Pr(D \mid I)}$$

The ECM algorithm, as known in the art, which is one of the generalized EM algorithms, can be used for this maximization, where the posterior likelihood still increases at each iteration. Rather than maximizing all the parameters simultaneously, each plane is maximized in turn using a gradient descent technique while the others are held constant. The covariance matrix of each plane is then approximated by the Hessian of the error function at the minimum.

It is noted that the classifying criteria relating to the generalized EM algorithm as follows. First, the E part classifies the pixels into layers, estimating their distribution over layers given the current estimates of the planes. The M part estimates the current best estimate of the planes corresponding to each layer, given the current pixel assignments.

PILLAGE Algorithm

In this section of the detailed description, a more detailed and generalized description of the PILLAGE algorithm referred to in the previous section of the detailed description is shown. The algorithm as described herein is applicable to other problem domains than that which is specifically considered by the other sections of the detailed description, such that the invention is not limited to any particular problem domain as to the applicability of the PILLAGE algorithm. Furthermore, the algorithm can in varying embodiments be implemented as a computer-implemented method, a machine-readable medium, a computer, a computerized system, etc.; the invention is not limited to a particular such embodiment.

The PILLAGE algorithm is a robust estimator for estimating a set of parameters $\Theta$ from a data set D. D is a set of n k-dimensional points, $m_i=(x_i^i, \ldots, X_k^i)$, i=1 ... k, represented by a stacked vector $D=(m_1^T, \ldots m_n^T)^T$. In particular, PILLAGE is useful for estimating manifolds, or surfaces, from set of data, such as estimating lines from a set of two-dimensional points. This application is most general as any set of constraints can be thought of as defining a surface through the data.

PILLAGE is related to the RANSAC algorithm known in the art in that both search for the best solution $\Theta$ by a hypothesis and test mechanism in which minimal subsets of the data $S_i$ are picked at random, where a minimal subset is defined as the minimum amount of data to estimate the parameters—for example, two points are the minimum required to estimate a line, three points for a plane, etc.—and used to estimate candidate solutions $\hat{\Theta}_i$. RANSAC evaluates a score for each candidate solution based on the number of inliers (data with error below a user-set threshold), and takes as the final estimate $\hat{\Theta}_i$ that maximizes the number of inliers. It is noted that RANSAC stands for RANdom SAmple Consensus.

At least one significant difference between the algorithms is that PILLAGE uses a different score to find the best solution. Rather than the arbitrary maximizing of the number of inliers, a more principled Bayesian approach is used, and the poster likelihood is maximized:

$$Pr(\Theta \mid D) = \frac{Pr(D \mid \Theta)Pr(\Theta)}{Pr(D)}.$$

The posterior has three terms: the number which is the product of the likelihood and prior, and the denominator which is constant over all $\Theta$ and can be ignored.

The evaluation of the likelihood is now explained. In one embodiment, the data can be modeled as arising from a set of inliers that conform to the parameters with some Gaussian error and a set of outliers that arise from some other source of data corruption or contamination. The distribution of inliers is defined as $$Pr(m|\Theta,\text{inlier}) = p_I(e)$$

where e is the measured error and $p_L$ is a density function, such as a Gaussian density function. The distribution of outliers is defined as $$Pr(m|\Theta,\text{outlier}) = p_o(e)$$

where e is the measured error and $p_o$ is a density function, such as a uniform or very diffuse function.

Therefore, the probability of the error for the ith point, $e_i$, is modeled as a mixture model of Gaussian and uniform distribution, $$Pr(D \mid \Theta) = \prod_i (\gamma p_1(e_i) + (1-\gamma)p_0(e_i))$$

where $\gamma$ is the mixing parameter, v is a constant, $\sigma$ is the standard deviation of the error, and $\Theta$ is given by the minimal set $S_i$. Although $\gamma$ is unknown, for any minimal subset chosen there can only be one choice of $\gamma$ that maximizes the posterior when all the data are considered. This choice uniquely specifies $\gamma$. This can be found using EM, as described below.

To estimate $\gamma$, using EM, a set of indicator variables needs to be introduced: $\eta_i$, i=1 ... n where $\eta_i$=1 if the ith correspondence is an inlier, and $\eta_i$=0 if the ith correspondence is an outlier. The EM algorithm proceeds as follows, treating the $\eta_i$ as missing data: (1) generating a guess for $\gamma$, (2) estimating the expectation of the $\eta_i$ from the current estimate of $\gamma$, (3) make a new estimate of $\gamma$ from the current estimate of $\eta_i$ and go to (2). This procedure is repeated until convergence and typically requires only two to three iterations.

In more detail, for stage (1) the initial estimate of $\gamma$ is ½. For stage (2), denote the expected value of $\eta_i$ is denoted by $z_i$, such that it follows that $Pr(\eta_i=1|\gamma)=z_i$. This is now estimated over all the data. Given an estimate of $\gamma$, this can be estimated as:

$$Pr(\eta_i = 1 \mid \gamma) = \frac{\gamma p_I(e_i)}{\gamma p_I(e_i) + (1-\gamma)p_O(e_i)}$$

and $Pr(\eta_i=0|\gamma)=1-z_i$. For stage (3), $$\gamma = \frac{1}{n}\sum_i z_i.$$

For real systems, it one embodiment it is helpful to put a prior on $\gamma$ the expected proportion of inliers, depending on the application. In this embodiment, the sum given above is weighted by this prior. The prior $Pr(\Theta)$ is of a form that is appropriate, but is typically Gaussian.

It is noted that PILLAGE can be used in one embodiment when there are multiple surfaces to be estimated. Suppose m surfaces are to be estimated. Then, PILLAGE proceeds substantially as has been described. If k points are needed to form a minimal subset S to estimate each surface, then mk points are sampled to simultaneously estimate k surfaces. Suppose that the likelihood of point m lying on surface j is $$Pr(m|\Theta, \text{on surface } j) = p_j(e),$$

and the outlier likelihood as is described above. Because there are j possible surfaces on which a point may lie, the likelihood is given by $$Pr(D \mid \Theta) = \prod_i \left( \left(\sum_j \gamma_j p_j(e_i)\right) + \left(1 - \sum_j \gamma_j\right) p_o(e_i) \right).$$

Once an initial estimate is supplied for the m surfaces, the EM algorithm is used to estimate the $\gamma_j$. A set of indicator variables is again used, such that $\eta_{ij}$=1 if the ith point is on the jth surface, and $\eta_{i0}$=1 means that the ith point is an outlier. Then $$Pr(\eta_{ia} = 1 \mid \gamma) = z_{ia} = \frac{\gamma_a p_a(e_i)}{\sum_j \gamma_j p_j(e_i) + (1 - \sum_j \gamma_j)p_o(e_i)},$$

and, $$\gamma_a = \sum_i z_{ia}.$$

In this manner, the likelihood, and from this the posterior, may be estimated from the minimal data set.

Figure 7:
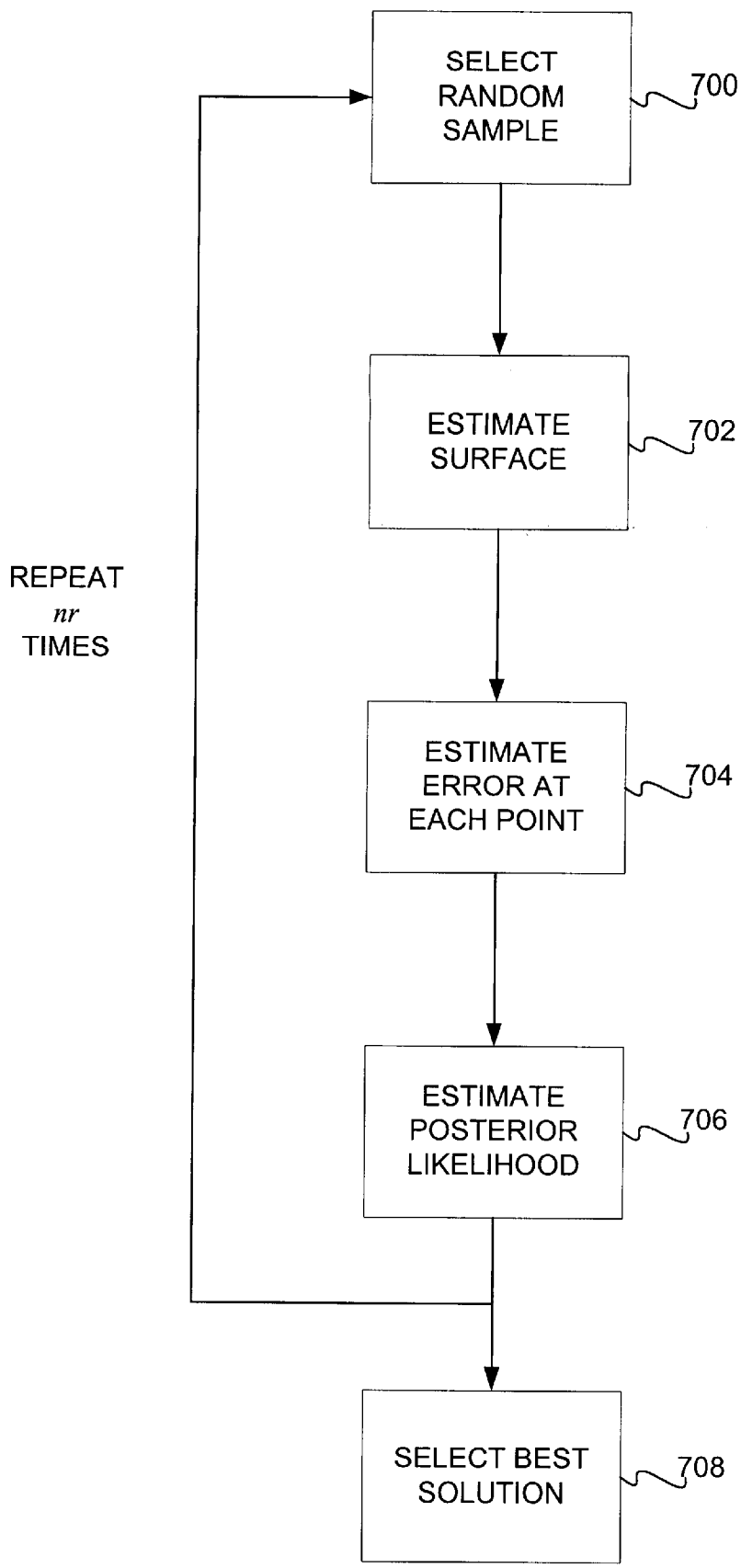

Referring now to FIG. 7, a flowchart of a method according to an embodiment of the invention is shown, that summarizes the description of PILLAGE that has been provided. 700, 702, 704 and 706 are repeated for a number of repetitions nr, as specified by the user. Specifically, in 700, a random sample of the minimum number of points $S_m = \{x_i^1, ^2\}$ that can be used to estimate the surface is selected. In 702, the surface is estimated, and in 704, the error e, is estimated at each point. In 704, the posterior likelihood of the surface is estimated, given all the data, using EM. This involves cycling through: (1) estimating the expectation of indicator variables; and, (2) estimating mixing parameters $\gamma$. Once 700, 702, 704 and 706 have been repeated nr times, then in 708, the best solution is selected over all the samples—that is, the solution with the highest posterior likelihood.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method for decomposing a plurality of images of a three-dimensional scene into a plurality of layers, comprising using a computing device to:

provide a sequence of images of a three-dimensional scene, with each image being acquired from a unique viewpoint of the scene;

rectify each image of the scene to a first image of the scene to remove affects of camera rotation;

estimate high entropy image features in the first image;

estimate parameters of a number of scene models from the high entropy image features, wherein a first scene model has one layer, and each subsequent scene model has one more layer than a previous scene model;

determine the most probable model of the number of scene models;

during the determination of the most probable model, for the first image, implicitly assign pixels representing the high entropy image features to corresponding layers in the most probable model, and, for each other image of the scene, implicitly assign corresponding pixels from the rectified images to the corresponding layers in the most probable model; and probabilistically assign pixels not representing high entropy features to the most likely layer of the most probable model for each such pixel.

2. The method of claim 1, wherein determining a most probable model comprises using a statistical estimation approach.

3. The method of claim 2, wherein using a statistical estimation approach comprises employing a Bayesian approach.

4. The method of claim 3, wherein employing a Bayesian approach comprises utilizing prior probabilities corresponding to at least one of: (1) number of layers; (2) orientation of layer planes; (3) offset of pixels belonging to a layer relative to a layer plane; (4) possibility that a neighboring pixel belongs to a layer identical to that of a given pixel; (5) degree of similarity of appearance, as determined by color composition, of different portions of a layer.

5. The method of claim 3, wherein employing a Bayesian approach comprises utilizing a likelihood function to capture evidence provided by the images of the scene regarding possible disparity in position of corresponding scene points across different input images of the scene.

6. The method of claim 3, wherein employing the Bayesian approach comprises utilizing a Maximum A-Posterior (MAP) criterion on a number of layers and layer assignment.

7. The method of claim 1 wherein assigning pixels not representing high entropy features to a most likely layer of the most probable model for each such pixel comprises utilizing an iterative EM approach.

8. The method of claim 1 wherein assigning pixels not representing high entropy features to the most likely layer of the most probable model for each such pixel comprises utilizing at least one classifying criteria.

9. The method of claim 8 wherein the at least one classifying criteria is selected from the group essentially consisting of: proximity modulated by color, and depth distribution.

10. The method of claim 1 further comprising outputting the layers of the most probable model.

11. The computer-implemented method of claim 1 wherein a feature extractor is used to extract the high entropy features from the first image of the scene.

12. A computer-implemented method operable on a three-dimensional scene having a plurality of images acquired from various unique viewpoints of the scene, where each image has a plurality of pixels corresponding to the plurality of pixels of each other image, the method comprising:

determining a plurality of high-entropy pixels of the plurality of pixels of a reference image of the scene using an image feature extractor for extracting regions of pixels representing high entropy features from the reference image of the scene;

determining each of a 1-plane estimation of the scene through a predetermined n-plane estimation of the scene based on the high-entropy pixels;

determining the number of planes of the scene based on the most likely estimation of the 1 to n estimations of the scene and assigning high-entropy pixels to one of the number of planes of the scene corresponding to the most likely estimation of the scene;

assigning pixels of the images other than the high-entropy pixels into one of the number of planes utilizing an iterative EM approach; and, outputting at least the planes of the scene.

13. The method of claim 12, wherein determining each of a 1-plane estimation of the scene through a predetermined n-plane estimation of the scene comprises performing a robust probabilistic estimation.

14. The method of claim 12, wherein determining the number of planes of the scene as a most likely of the 1-plane estimation of the scene through the predetermined n-plane estimation of the scene comprises utilizing a Bayesian method.

15. The method of claim 12, wherein assigning pixels other than the high-entropy pixels into one of the number of planes comprises utilizing an iterative EM approach based on at least one classifying criteria selected from the group essentially consisting of: proximity modulated by color, and depth distribution.

16. The method of claim 12, wherein outputting the planes of the scene further comprises outputting each pixel of the images by plane.

17. The method of claim 12 further comprising rectifying each image of the scene to the reference image of the scene prior to determining the number of planes of the scene as a most likely of the 1-plane estimation of the scene through the predetermined n-plane estimation of the scene.

18. A machine-readable medium having instructions stored thereon for execution by a processor to perform a method comprising:

inputting a three-dimensional scene having a plurality of images, with each image being captured from a unique viewpoint of the scene having a known offset from each other viewpoint of the scene, and wherein each image has a plurality of pixels;

computing high-entropy image regions from one of the plurality of images serving as a reference image;

determining a number of scene models by estimating parameters of the scene models from the high entropy image regions, wherein a first scene model has one plane, and each subsequent scene model has one more plane than each previous scene model;

determining which of the scene models is most probable, and assigning pixels of all images corresponding to the high entropy image regions of the reference image to corresponding planes of the most probable scene model; and assigning any remaining pixels of the images into the most likely plane of the most probable scene model.

19. The medium of claim 18, wherein determining the number of scene models from high-entropy image regions comprises using a statistical estimation approach.

20. The medium of claim 19, wherein using a statistical estimation approach comprises employing a Bayesian approach.

21. The medium of claim 20, wherein employing a Bayesian approach comprises utilizing prior probabilities corresponding to at least one of: (1) number of layers; (2) orientation of layer planes; (3) offset of pixels belonging to a layer relative to a layer plane; (4) possibility that a neighboring pixel belongs to a layer identical to that of a given pixel; (5) degree of similarity of appearance, as determined by color composition, of different portions of a layer.

22. The medium of claim 20, wherein employing a Bayesian approach comprises utilizing a likelihood function to capture evidence provided by the images regarding possible disparity in position of corresponding scene points across different input images.

23. The medium of claim 20, wherein employing a Bayesian approach comprises utilizing a Maximum A-Posterior (MAP) criterion on a number of layers and layer assignment.

24. The medium of claim 18, wherein assigning any remaining pixels into the most likely plane of the most probable scene model comprises utilizing an iterative EM approach for pixel assignment.

25. A machine-readable medium having instructions stored thereon for execution by a processor to perform a method comprising:

inputting a three-dimensional scene having a plurality of images, wherein each image is captured from a unique viewpoint of the scene, and wherein each image has a plurality of pixels;

determining a plurality of high-entropy pixels of the plurality of pixels of a reference image of the scene;

rectifying each image of the scene to the reference image of the scene to compensate for camera rotations resulting from use of unique viewpoints of the scene;

using the high entropy pixels for probabilistically determining each of a 1-plane estimation of the scene through a predetermined n-plane estimation of the scene;

determining the number of planes of the scene based on the most likely estimation of the 1 to n estimations of the scene via a Bayesian method, and assigning pixels of all images corresponding to the high entropy image regions of the reference image to a corresponding one of the number of planes of the scene;

assigning pixels other than the high-entropy pixels into one of the number of planes utilizing an iterative EM approach based on at least one classifying criteria; and outputting at least the planes of the scene.

26. The medium of claim 25, wherein outputting the planes of the scene further comprises outputting each pixel of the images by plane.

* * * * *

UNITED STATES PATENT AND TRADEMARK OFFICE
CERTIFICATE OF CORRECTION

PATENT NO. : 6,668,080 B1
DATED : December 23, 2003
INVENTOR(S) : Torr et al.

It is certified that error appears in the above-identified patent and that said Letters Patent is hereby corrected as shown below:

<u>Title page,</u>
Item [75], Inventors, the last name of the second listed inventor should be spelled
-- Padmanabhan --

<u>Column 7,</u>
Lines 33-34, the equation should appear as follows: $O_j, j = 1...m$ <u>Column 12,</u>
Line 45, the equation should appear as follows: $l_k(x,y) = 1$ <u>Column 13,</u>
Line 15, the equation should appear as follows: $p_{jk} = \Pr(l_j(u,v) | l_k(x,y) I)$ <u>Column 16,</u>
Lines 43-44, "$S_m = \{x_i^1, 2\}$" should be changed to -- $S_m = \{x_i^{1,2}\}$ --

Line 45, "error e" should be changed to -- error $e_i$ --

Signed and Sealed this

First Day of June, 2004

JON W. DUDAS
*Acting Director of the United States Patent and Trademark Office*